United States Patent
Cho

(10) Patent No.: US 11,055,771 B2
(45) Date of Patent: Jul. 6, 2021

(54) METHOD FOR AUCTIONING BIDDING PRODUCT, LINKED WITH PRODUCT SALES VOLUME

(71) Applicant: Jun Bum Cho, Seoul (KR)

(72) Inventor: Jun Bum Cho, Seoul (KR)

( * ) Notice: Subject to any disclaimer, the term of this patent is extended or adjusted under 35 U.S.C. 154(b) by 0 days.

(21) Appl. No.: 16/481,836

(22) PCT Filed: Jan. 30, 2018

(86) PCT No.: PCT/KR2018/001282
§ 371 (c)(1),
(2) Date: Jul. 30, 2019

(87) PCT Pub. No.: WO2018/143644
PCT Pub. Date: Aug. 9, 2018

(65) Prior Publication Data
US 2020/0065893 A1 Feb. 27, 2020

(30) Foreign Application Priority Data
Jan. 31, 2017 (KR) .................. 10-2017-0014021

(51) Int. Cl.
*G06Q 30/08* (2012.01)
*G06Q 30/02* (2012.01)
(Continued)

(52) U.S. Cl.
CPC .......... *G06Q 30/08* (2013.01); *G06Q 30/0207* (2013.01); *G06Q 30/0601* (2013.01); *G06Q 40/04* (2013.01); *G06Q 50/10* (2013.01)

(58) Field of Classification Search
CPC ............... G06Q 30/08; G06Q 30/0207; G06Q 30/0601; G06Q 40/04; G06Q 50/10; G06Q 30/02; G06Q 30/06
See application file for complete search history.

(56) References Cited

U.S. PATENT DOCUMENTS

| 8,175,915 B1 * | 5/2012 | Mullins .................. G06Q 30/08 |
| | | 705/14.15 |
| 2002/0004775 A1 * | 1/2002 | Kossovsky ............ G06Q 40/04 |
| | | 705/37 |

(Continued)

FOREIGN PATENT DOCUMENTS

| JP | 2001-250071 A | 9/2001 |
| JP | 2002-041859 A | 2/2002 |

(Continued)

OTHER PUBLICATIONS

Gamma: What to do if your buyer do not pay right away, Jun. 23, 2016, pp. 1-12 (Year: 2016).*

(Continued)

*Primary Examiner* — Bijendra K Shrestha
(74) *Attorney, Agent, or Firm* — Antonio Ha & U.S. Patent, LLC

(57) ABSTRACT

One aspect of the present invention can comprise: a bidding starting price determination step of allowing a bidding product shopping mall server to determine a bidding starting price of a bidding product by linking with the sales volume of a shopping product having been sold online or offline; a bidding information transmission step of allowing the bidding product shopping mall server to transmit bidding product information, a bidding tender schedule, and a bidding starting price to communication terminals used by customers, who have bidding qualifications and can bid in the auction for the bidding product; a successful bidder determination step of allowing the bidding product shopping mall server to determine a successful bidder among bidding participants participating in a bidding tender by proceeding with the bidding tender having the bidding starting price at the minimum price for the customers having bidding qualifications during a preset bidding tender period; and a bidding product selling step of allowing the bidding product shop- (Continued)

ping mall server to proceed with bidding product sales at the bidding price of the successful bidder.

3 Claims, 8 Drawing Sheets

(51) Int. Cl.
*G06Q 30/06* (2012.01)
*G06Q 40/04* (2012.01)
*G06Q 50/10* (2012.01)

(56) References Cited

U.S. PATENT DOCUMENTS

| | | | | |
|---|---|---|---|---|
| 2004/0059637 | A1* | 3/2004 | Jung | G06Q 30/08 705/315 |
| 2005/0289043 | A1* | 12/2005 | Maudlin | G06Q 40/04 705/37 |
| 2006/0200401 | A1* | 9/2006 | Lisani | G06Q 30/00 705/37 |
| 2007/0100740 | A1* | 5/2007 | Penagulur | G06Q 30/08 705/37 |
| 2007/0136175 | A1* | 6/2007 | Song | G06Q 40/04 705/37 |
| 2010/0125525 | A1* | 5/2010 | Inamdar | G06Q 30/02 705/80 |
| 2012/0246021 | A1* | 9/2012 | Hamor | G06Q 30/00 705/26.3 |
| 2013/0103532 | A1* | 4/2013 | Emura | G06Q 30/08 705/26.3 |
| 2014/0195364 | A1* | 7/2014 | Gupta | G06Q 30/0283 705/26.1 |
| 2014/0279168 | A1* | 9/2014 | Malaczynski | G06Q 30/0611 705/26.4 |
| 2015/0006309 | A1* | 1/2015 | Philipson | G06Q 30/0605 705/26.2 |
| 2015/0302470 | A1* | 10/2015 | Dru | G06Q 30/08 705/14.51 |

FOREIGN PATENT DOCUMENTS

| | | | | |
|---|---|---|---|---|
| JP | 2002-049812 | A | 2/2002 | |
| JP | 2006-521630 | A | 5/2007 | |
| JP | 2009-042797 | A | 2/2009 | |
| JP | 2009-043206 | A | 2/2009 | |
| JP | 2009-075895 | A | 4/2009 | |
| JP | 2016-062325 | A | 10/2017 | |
| KR | 10-2000-0049426 | | 8/2000 | |
| KR | 10-2001-0090962 | | 10/2001 | |
| KR | 10-2004-0084179 | | 10/2004 | |
| KR | 10-0471371 | | 3/2005 | |
| KR | 10-2009-0087252 | | 8/2009 | |
| KR | 10-1029777 | | 4/2011 | |
| KR | 20150041813 | A * | 4/2015 | G06Q 30/08 |
| WO | WO-2005001597 | A2 * | 1/2005 | G06Q 30/08 |

OTHER PUBLICATIONS

Gamma: Second chance offers: a how-to for sellers, Feb. 29, 2016, pp. 1-7. (Year: 2016).*
Ausubel et al.: Dynamic Auctions in Procurement, Feb. 21, 2006, Handbook of Procurement, Cambridge, England, pp. 1-21. (Year: 2006).*
English Specification of 10-2004-0084179.
English Specification of 10-0471371.
English Specification of 10-2001-0090962.
English Specification of 10-2009-0087252.
English Specification of 10-1029777.
English Specification of 10-2000-0049426.
English Specification of JP2001-250071A.
English Specification of JP2002-041859A.
English Specification of JP2002-049812A.
English Specification of JP2006-521630A.
English Specification of JP2009-042797A.
English Specification of JP2009-043206A.
English Specification of JP2009-075895A.
English Specification of JP2016-062325A.

* cited by examiner

|  | A | B |
|---|---|---|
| number of shopping products in inventory | 10 | 20 |
| number of shopping products sold | 10 | 20 |
| bidding product consumer price | 1,000,000 KRW | 1,000,000 KRW |
| discount rate(%) | 100% | 100% |
| floating price | 100,000 KRW | 50,000 KRW |
| bidding start price | 0 KRW | 0 KRW |

(b)

|  | A | B |
|---|---|---|
| number of shopping products in inventory | 10 | 20 |
| number of shopping products sold | 10 | 20 |
| bidding product consumer price | 1,000,000 KRW | 1,000,000 KRW |
| discount rate(10%) | 75% | 75% |
| floating price | 75,000 KRW | 37,500 KRW |
| bidding start price | 250,000 KRW | 250,000 KRW |

METHOD FOR AUCTIONING BIDDING PRODUCT, LINKED WITH PRODUCT SALES VOLUME

TECHNICAL FIELD

The present invention relates to a method for auctioning bidding products, and more specifically, to a method for auctioning bidding products in an efficient manner.

BACKGROUND ART

Conventional shopping malls which consist of a database for managing users information and products information, a web server, and an email server simply provide the function of searching for a product for purchase and purchasing the product.

Conventional auction service methods for providing real-time price information notification functionality regarding Internet auction are configured with a real-time price information notification process which, upon receiving new price information regarding a particular bidding product, transmits the received price information to subscribers in real-time. In other words, conventional Internet auction service methods with real-time price notification functionality are configured with a real-time price information notification process which, upon receiving new price about a particular bidding product, transmits the received price information to the subscribers in real-time. At this time, the real-time price information notification process consists of a first step which accepts applications for auction per product from subscribers and store the applications in a database, a second step in which a bidder searches for bidder information about the bidding product while the current price of the bidding product is updated when the bidding price is a good price, and a third step which transmits, in real-time, received price information to all the bidders or subscribers discovered in the second step.

However, the conventional Internet auction service methods with real-time price information notification functionality have the start price previously determined, thus causing the bidders to lose interest. Despite real-time offering of price information to cause bidding competition, it mostly fails to lead to purchase of the product.

DETAILED DESCRIPTION OF THE INVENTION

Technical Problem

An object of the present invention is to provide a method of auctioning bidding products associated with sales volume to thereby enable efficient bidding product auctioning.

Technical Solution

According to an embodiment of the present invention, a method for auctioning a bidding product associated with sales volume comprises a bidding start price determination step in which a bidding product shopping mall server determines a bidding start price of a shopping product in association with the quantity of shopping products selling or sold online or offline, a bidding information transmission step in which the bidding product shopping mall server transmits bidding product information, a bidding schedule, and the bidding start price to communication terminals of customers entitled to bid for a bidding product, a winner determination step in which the bidding product shopping mall server proceeds with bidding at the bidding start price, as a lowest price, for the customers during a preset bidding period, and a bidding product selling step in which the bidding product shopping mall server sells the bidding product at the winner's bidding price.

The customers entitled to bid for the bidding product may be customers who have purchased a shopping product before online or offline at a shopping mall which auctions the bidding product.

Determining the bidding start price of the bidding product in association with the quantity of sold shopping product may include determining that the bidding start price decreases as the quantity of sold shopping products increases.

Determining the bidding start price of the bidding product in association with the quantity of sold shopping product may include determining the bidding start price by a floating price calculated by a discount rate (%) set by a manager when the bidding product is registered, and the bidding start price may be determined by "bidding start price=consumer price of bidding product− floating price× quantity of sold shopping product."

The floating price may be calculated by "floating price=consumer price of bidding product/quantity of sold shopping product× discount rate (%)."

The winner determination step may include a bidding step to receive desired purchase prices not less than the bidding start price from communication terminals of bidders of the bidding during the bidding period and to receive bids; a bid ranking step to calculate bid ranks of the bidders in descending order of desired purchase prices and a bidding award step to determine a winner in descending order of the winning ranks.

The bidding product selling step may include a bid rank result notification step which transmits lists of bidders and desired purchase prices which have been sorted out in descending order of the desired purchase prices to the bidders' communication terminals and a bid rank-linked selling step which proceeds to sell the bidding product to the bidders in descending order of desired purchase prices.

The bid rank-linked selling step may include a product purchase request step to send a request for purchasing the product at the desired purchase price to the communication terminal of a highest bidder who offers a highest bid, a product selling complete step to receive a payment for the product from the highest bidder during a predetermined product selling period and complete the product sale, a next-highest bidder purchase request step to, when no payment is made within the product selling period, send a request for purchasing the product at the desired purchase price to a next-highest bidder's communication terminal, and a step of repeating the next-highest bidder purchase request step until all of a prepared number of bidding products are sold out.

Advantageous Effects

According to the embodiments of the present invention, there may be provided a method for auctioning bidding products associated with sales volume, making it available to various product selling applications.

BRIEF DESCRIPTION OF DRAWINGS

FIG. 4 is a view illustrating an example of determining a bidding start price in association with the quantity of sold shopping products according to an embodiment of the present invention;

MODE FOR CARRYING OUT THE INVENTION

Advantages and features of the present invention, and methods for achieving the same may be understood through the embodiments to be described below taken in conjunction with the accompanying drawings. However, the present invention is not limited to the embodiments disclosed herein, and various changes may be made thereto. The embodiments disclosed herein are provided only to inform one of ordinary skilled in the art of the category of the present invention. The present invention is defined only by the appended claims. When determined to make the subject matter of the present invention unclear, the detailed description of the known art or functions may be omitted.

Figure 1:
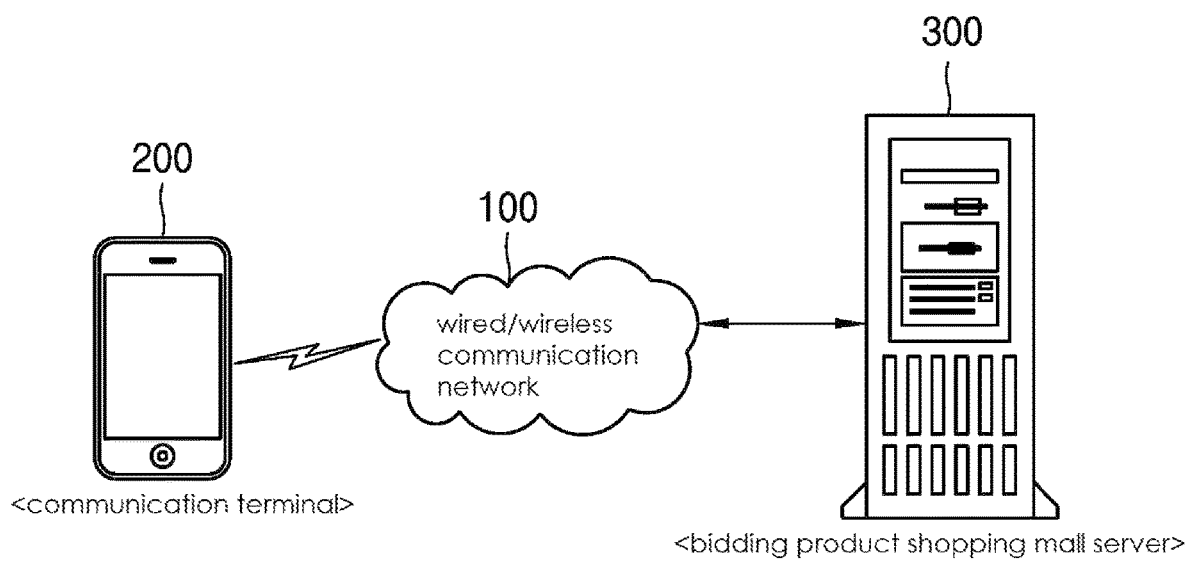
FIG. 1 is a view illustrating a configuration of a bidding product auctioning system associated with the quantity of sold shopping products according to an embodiment of the present invention.
Figure 2:
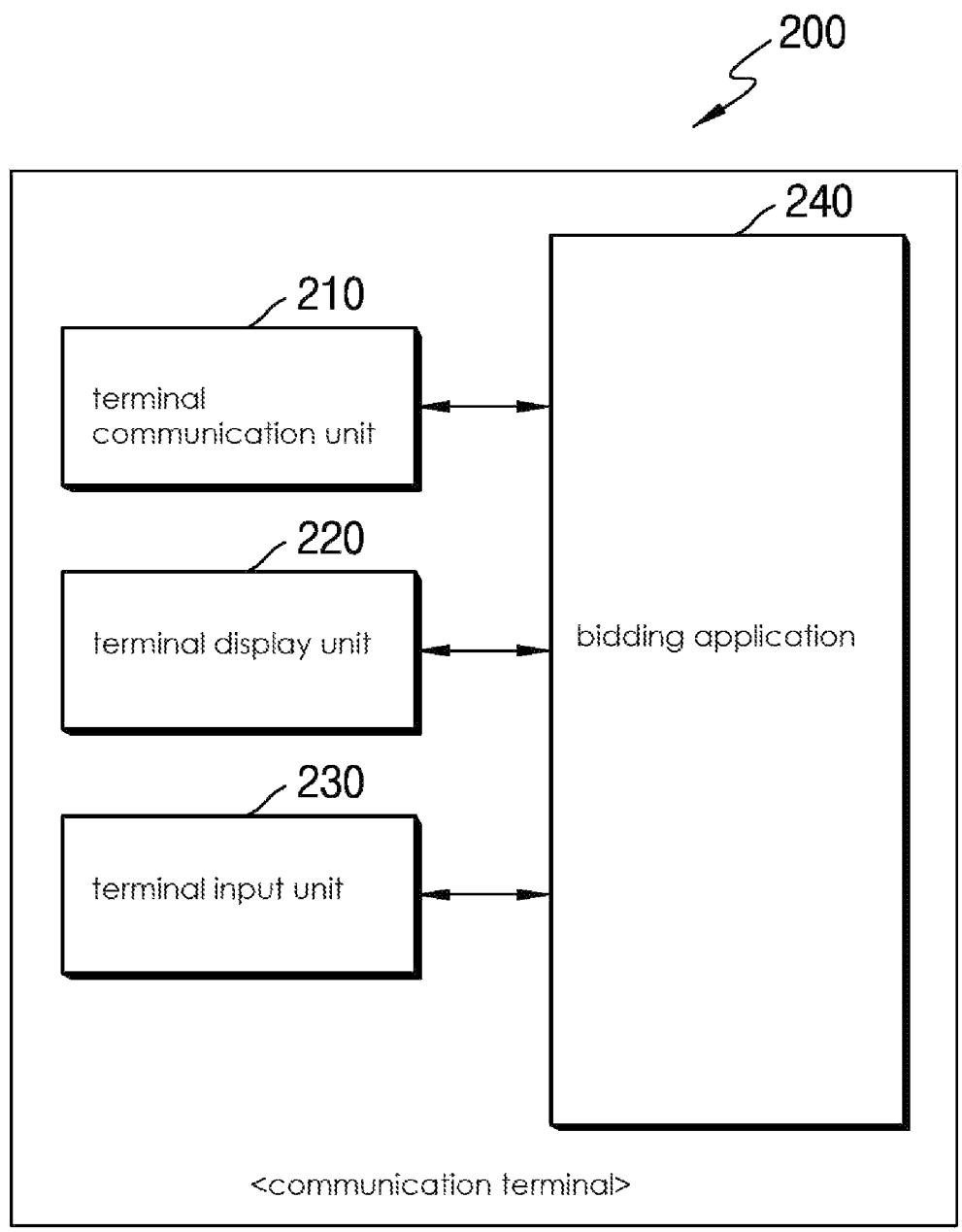
FIG. 2 is a block diagram illustrating a communication terminal according to an embodiment of the present invention.

FIG. 1 is a view illustrating a configuration of a bidding product auctioning system associated with the quantity of sold shopping products according to an embodiment of the present invention. FIG. 2 is a block diagram illustrating a configuration of a communication terminal according to an embodiment of the present invention.

According to the present invention, a bidding product auctioning system associated with the quantity of sold shopping products may include a wired/wireless communication network 100, a communication terminal 200, and a bidding product shopping mall server 300.

The wired/wireless communication network 100 provides wired or wireless communication between the communication terminal 200 and the bidding product shopping mall server 300. Where the wired/wireless communication network 100 is implemented as a wireless communication network, data communication may be performed via a wireless mobile communication network including a base station (or base transceiver station (BTS)), a mobile switching center (MSC), and a home location register (HLR). Where the wired/wireless communication network 100 is implemented as a wired communication network, data communication may be performed as per internet protocols, such as transmission control protocol/internet protocol (TCP/IP).

The communication terminal 200 is a terminal that a customer uses and, although the communication terminal 200 is shown to be a smartphone in the drawings as an example, it may be not only the smartphone but may also be a desktop PC, a tablet PC, a slate PC, a laptop computer, a digital broadcast terminal, a personal digital assistant (PDA), a portable multimedia player (PMP), or a navigation device. Of course, the terminal to which the present invention is applicable is not limited to the above described ones but may rather include all terminals which may communicate with external devices.

A customer who is entitled to bid for a bidding product may access the bidding product shopping mall server 300 and attend the bidding product auction using her communication terminal 200. Here, "customer who is entitled to bid for a bidding product" may be only customers who have purchased products of corresponding deals before, online or offline, at the shopping mall that auctions bidding products. Thus, where shopping products are on sale, customers who have purchased the shopping products may be given a qualification to bid for bidding products as a bonus event.

For reference, "bidding" refers to an activity of offering a desired price to buy an auctioned product. Thus, "bidding product" refers to a product which is to be sold at the hammer price at auction.

The communication terminal 200 may include a terminal communication unit 210, a terminal display unit 220, a terminal input unit 230, and a bidding application 240 as shown in FIG. 2.

The terminal communication unit 210 is a module that performs the function of communicating with the bidding product shopping mall server 300 through a mobile communication network and, where it performs mobile communication such as 3G or 3G, includes an RF transmitter (not shown) to up-convert the frequency of signals wirelessly transmitted and amplify the signals and an RF receiver (not shown) to low-noise amplify received wireless signals and down-convert the frequency of the signals.

The terminal display unit 220 displays bidding product information, bidding schedule, and bidding start price received from the bidding product shopping mall server 300. Upon bidding, the terminal display unit 220 receives and displays the result of bidding.

The terminal input unit 230 receives bids. The terminal input unit 230 and the terminal display unit 220 may be implemented as a single for of touchscreen panel. The touchscreen panel provides a touchscreen capable of both input and display, is provided on the front surface of the terminal to display task screens and displays graphic user interfaces (GUIs).

The bidding application 240 receives bidding prices for the bidding product when bidding proceeds and transmits the bidding prices to the bidding product shopping mall server 300. The bidding application 240 receives the result of bidding and displays the result on the terminal display unit 220. For reference, the communication terminal 200 which is implemented as a smartphone may allow a few hundreds of types, various applications installed thereon, added thereto, or deleted therefrom as the user desires. The user by herself may produce her desired applications and may thus implement interfaces suited for herself through various applications. Thus, the bidding application 240 may be downloaded from Google Market or Apple Store and be installed on the smartphone.

It is apparent that the functionality of the bidding application 240 may be replaced or implemented with, e.g., a homepage the bidding product shopping mall server 300 provides.

Meanwhile, although in the above example bidding products are subjected to auction online on the bidding application 240 of the communication terminal 200, it is apparent that the present invention may perform the auction or bidding not only on online but also offline. In other words, various kinds of offline work, such as discovery of affiliates which are available to bidding, various events, and online or offline promotions, may be carried out.

The affiliates may be various kinds of businesses, such as sales, services, accommodations, restaurants, franchises, convenient stores, or travel agencies, and customers who use offline affiliates are given bidding rights simultaneously with payment for products or services. Here, a method suited for businesses and contexts is adopted and bidding rights are given by the adopted method.

How to give offline bidding rights may be determined depending on the context of affiliates. For example, when a product or service is used and paid for, the barcode may be used to give a bidding right and attend bidding, or it may be automatically sent out as coupon number-containing text after the customer's cell phone is authenticated through the affiliate's managing webpage. Where some affiliate has difficulty in online access, a printout with a coupon number may be provided to the customer, and the customer, after authentication, may participate in bidding.

The bidding product shopping mall server 300 is a shopping mall server which sells bidding products at auction for bidding participants during a bidding intent notification period. The bidding product shopping mall server 300 may have substantially the same configuration as a typical web server in terms of hardware and may be implemented in various programming languages, such as C, C++, Java, Visual Basic, or Visual C in terms of software while including programming modules that have various functions. The real property agency server 300 may also be implemented by combining various web server programs which are provided depending on operating systems (OSs), such as Dos, Window, Linus, Unix, or Macintosh, with a common hardware device for servers.

The bidding product shopping mall server 300 discloses a plurality of special offer products or limited products (bidding products) which are to be shopped on the homepage selling special offer products or limited products and bidding products (e.g., luxury goods) associated with bidding start prices and opens the start price of the bidding product to the purchasers of the shopping product during a particular period (close the price after the particular period elapses) so that the purchasers may enter bidding prices for the bidding product and the bidding product is sold to the purchaser who offered the highest bid.

To that end, the bidding product shopping mall server 300 transmits bidding product information, bidding schedule, and bidding start price to the communication terminals 200 of the customers who are entitled to bidding and determines the bidding start price of the bidding product in association with the quantity of shopping products sold online or offline.

The bidding product shopping mall server 300 transmits the bidding start price to the communication terminals 200 of the customers qualified for bidding and proceeds with bidding at the lowest bidding start price during the bidding period and determines the winner among the bidders. The bidding product is sold at the winner's bidding price.

Figure 3:
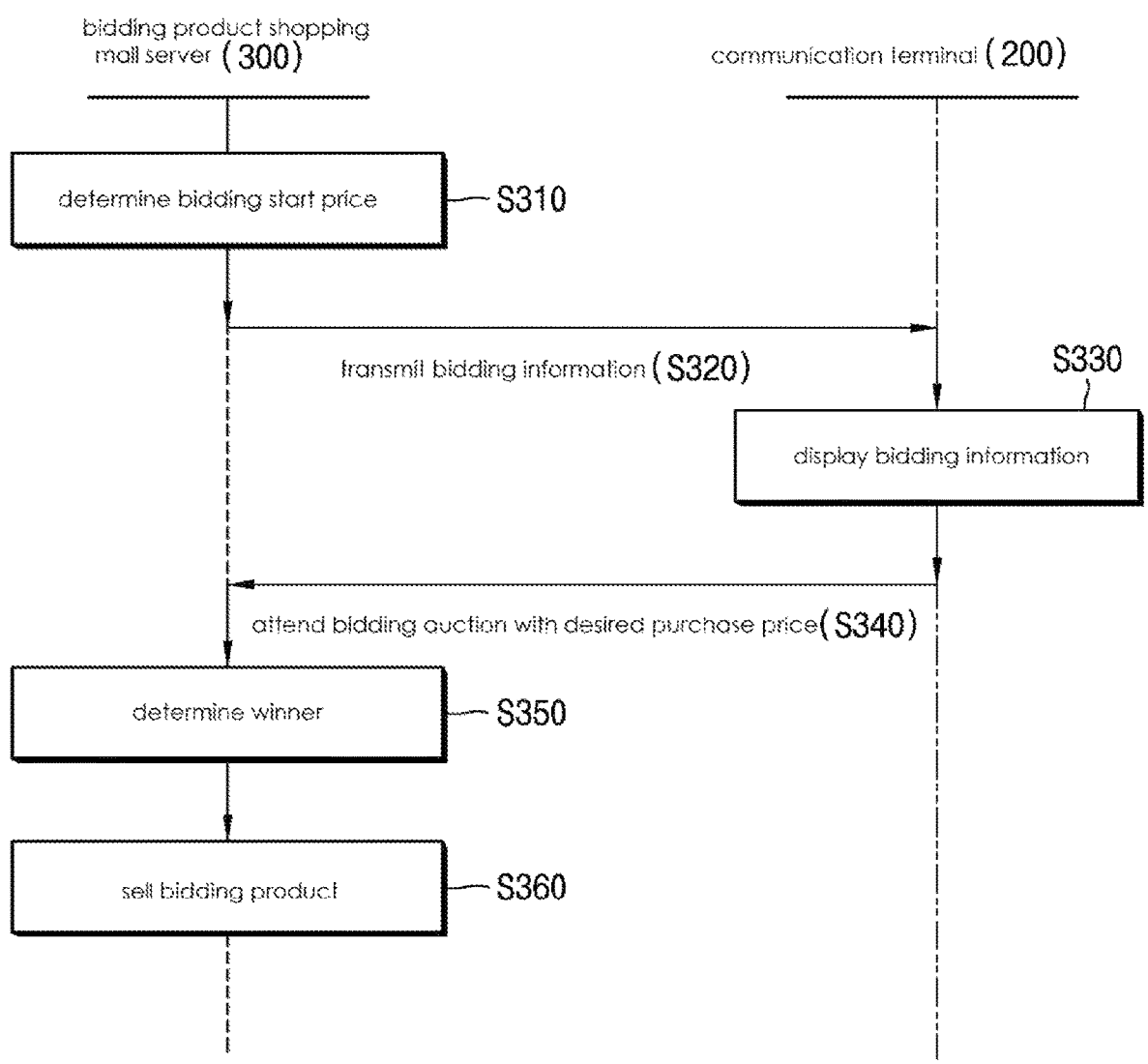
FIG. 3 is a flowchart illustrating a bidding product auctioning process associated with the quantity of sold shopping products according to an embodiment of the present invention.
Figure 5:
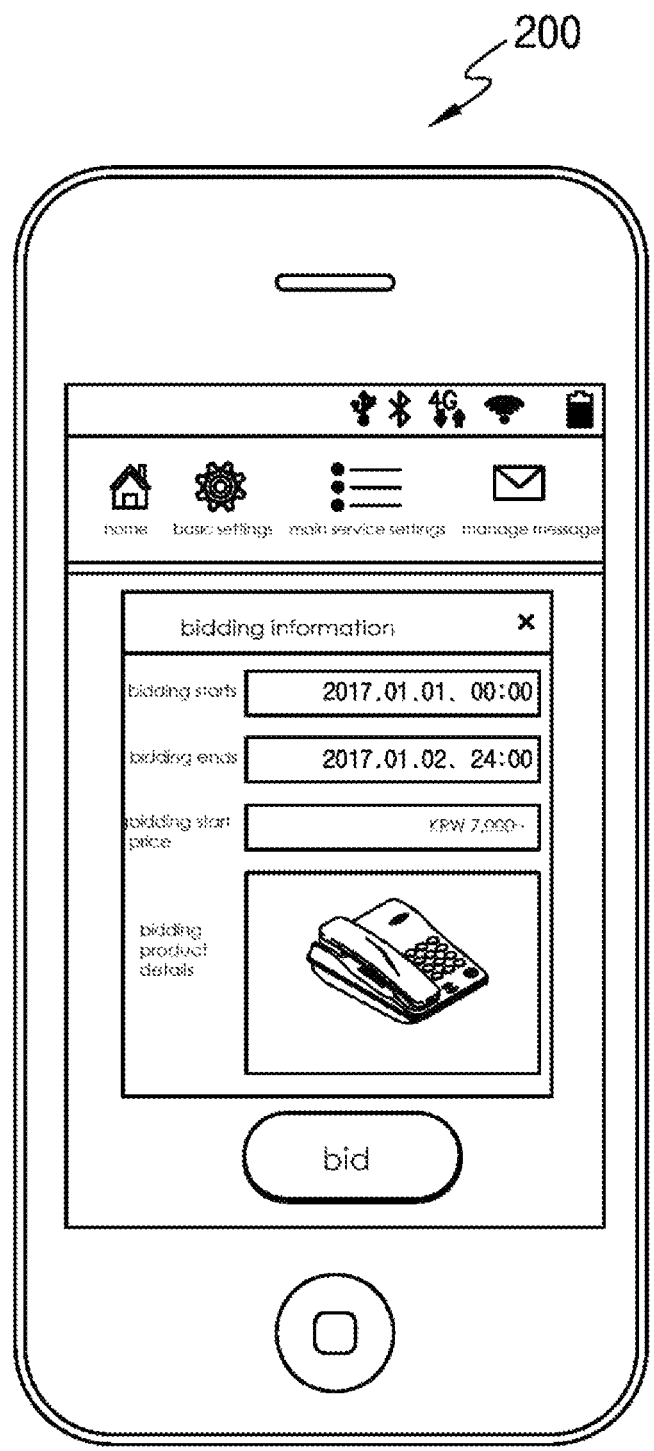
FIG. 5 is a view illustrating a communication terminal which displays a bidding start price according to an embodiment of the present invention.
Figure 6:
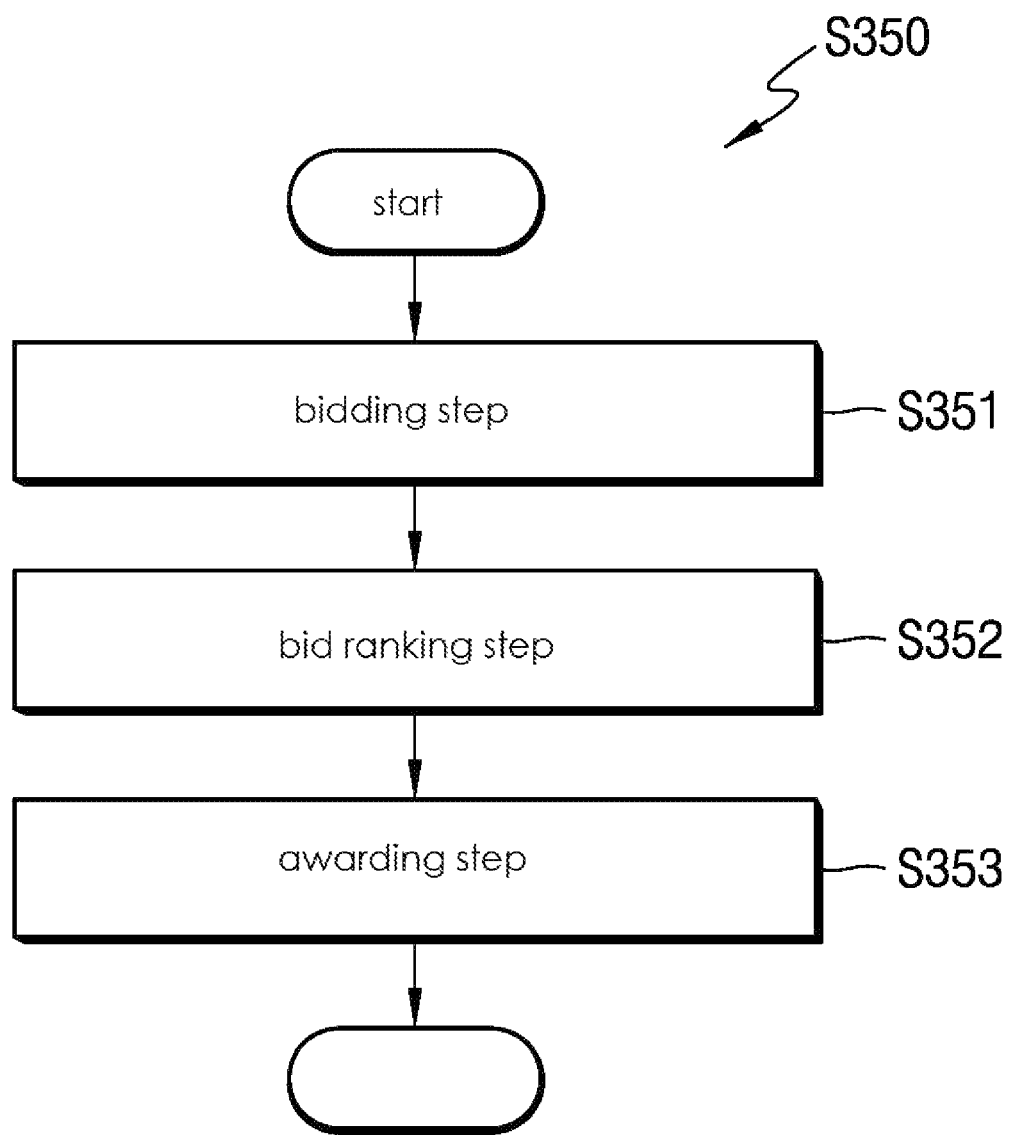
FIG. 6 is a flowchart illustrating a process of determining a winner according to an embodiment of the present invention.
Figure 7:
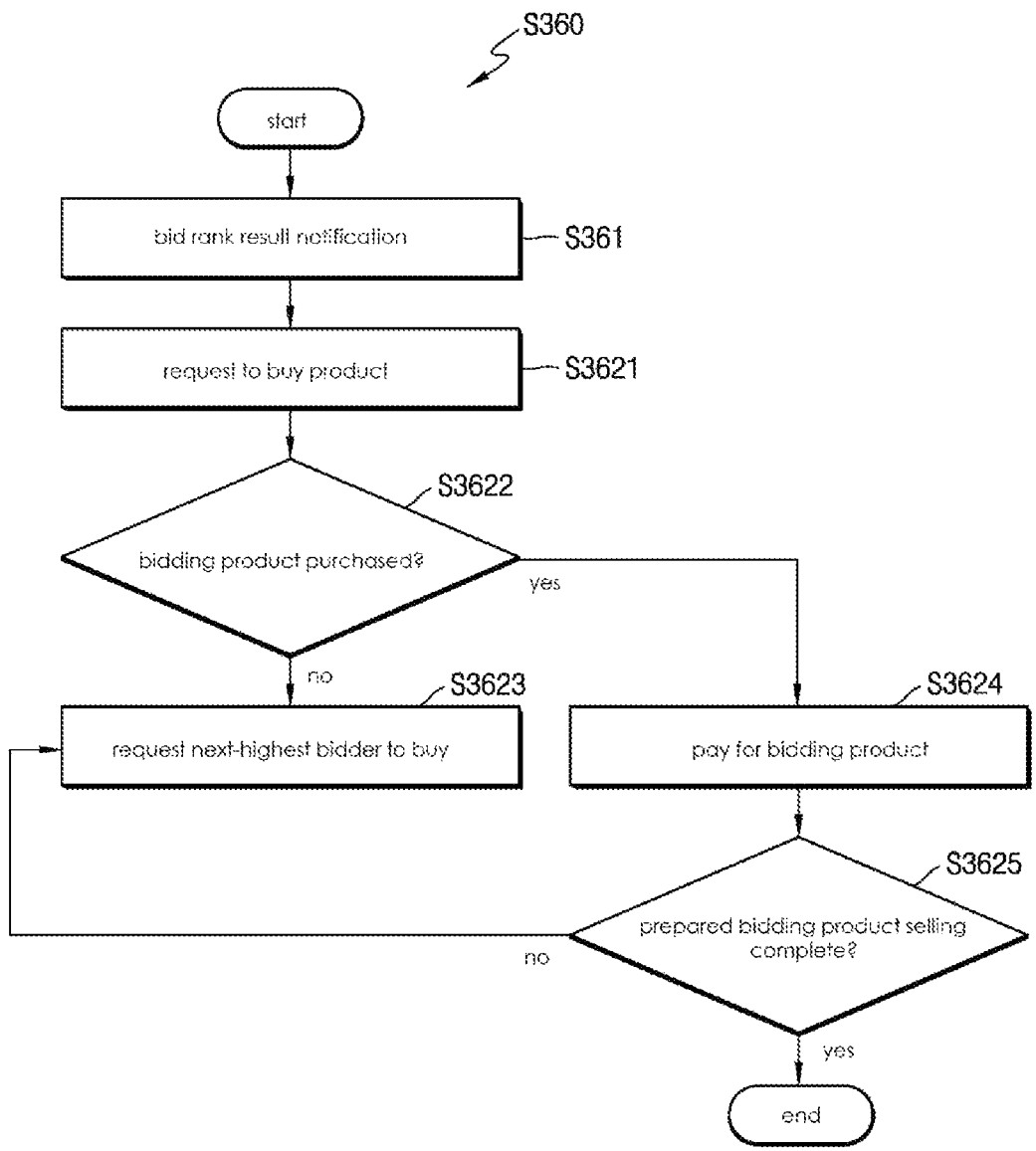
FIG. 7 is a flowchart illustrating a process of selling a bidding product according to an embodiment of the present invention.
Figure 8:
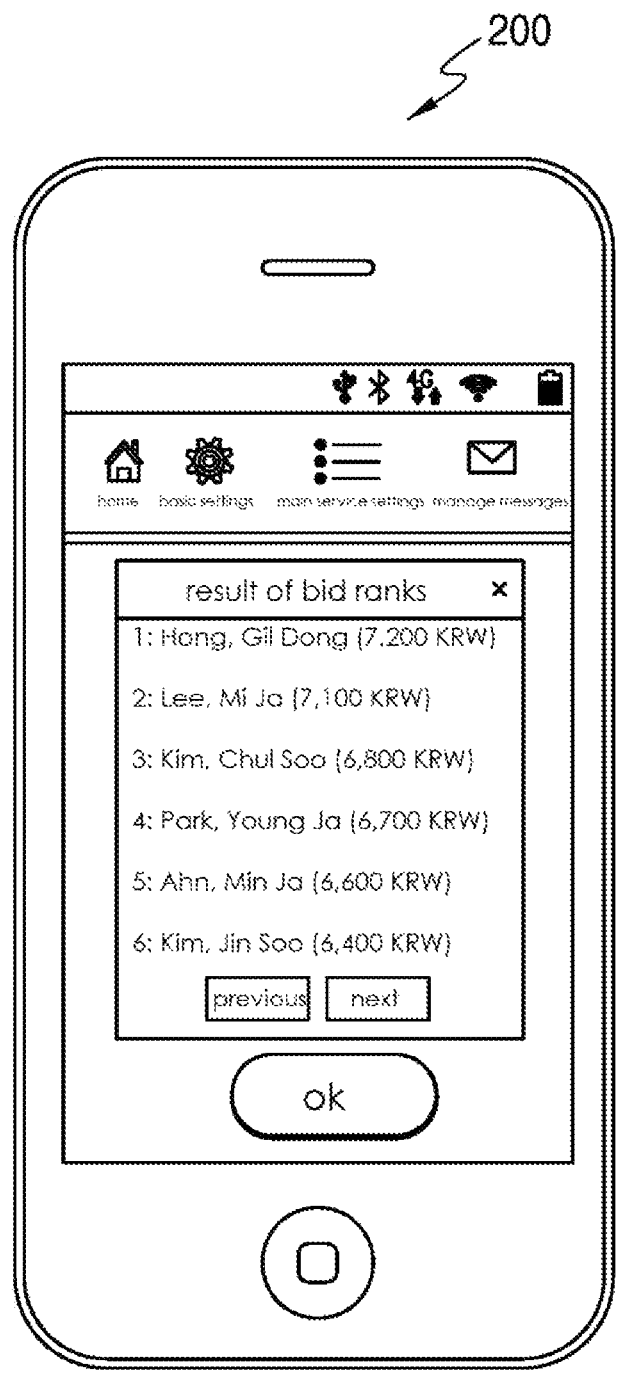
FIG. 8 is a view illustrating a communication terminal which displays a result of bid ranks according to an embodiment of the present invention.

FIG. 3 is a flowchart illustrating a bidding product auctioning process associated with the quantity of sold shopping products according to an embodiment of the present invention. FIG. 4 is a view illustrating an example of determining a bidding start price in association with the quantity of sold shopping products according to an embodiment of the present invention. FIG. 5 is a view illustrating a communication terminal which displays a bidding start price according to an embodiment of the present invention. FIG. 6 is a flowchart illustrating a process of determining a winner according to an embodiment of the present invention. FIG. 7 is a flowchart illustrating a process of selling a bidding product according to an embodiment of the present invention. FIG. 8 is a view illustrating a communication terminal which displays a result of bid ranks according to an embodiment of the present invention.

According to the present invention, a bidding product auctioning process associated with sales volume may include a bidding start price determination step S310, a bidding information transmission step S320, a winner determination step S350, and a bidding product selling step S360.

The bidding product shopping mall server 300 provides the bidding start price determination step S310 to determine a bidding start price for a bidding product in association with the quantity of shopping products selling or sold online or offline.

Determining the bidding start price of the bidding product in association with the quantity of sold shopping products determines that the more shopping products are sold, the lower bidding start price is.

Further, where the sold shopping product is returned or paid back for, the bidding start price is determined to increase in proportion to the number of products returned or paid back for. The reason is why in a case where a shopping product is returned or paid back for so that the sale of the shopping product is canceled, this may be reflected in real-time to adjust and determine the bidding start price.

Meanwhile, determining the bidding start price of the bidding product in association with the quantity of sold shopping product may determine the bidding start price by a floating price calculated by discount rate (%) set by the manager when the bidding product is registered. The bidding start price may be determined by the following equation: "bidding start price=consumer price of bidding product− floating price× quantity of sold shopping product"

Here, the floating price may be calculated by the following equation: "floating price=consumer price of bidding product/quantity of sold shopping product× discount rate (%)" Here, the floating price functions as a safety device to adjust the falling rate of the bidding start price for the bidding product due to purchase of normal products by applying the discount rate (%) when the bidding product is registered in order to minimize loss given the break-even point of the seller according to the margin of the normal products. Thus, when the above floating price formula is applied, the bidding start price of FIGS. 4(a) and (b) may be derived.

For reference, although products are basically configured in a ratio of shopping products (10 in inventory) to bidding products (1 in inventory), the inventory of shopping products, the inventory of bidding products, or the range of linked products may be varied in some cases.

Meanwhile, if the bidding start price is determined, the bidding information transmission step S320 is performed in which the bidding product shopping mall server 300 transmits bidding product information, bidding schedule, and bidding start price to the communication terminals 200 of the customers who are entitled to bid for the bidding products. Here, "customer who is entitled to bid for a bidding product" may be only customers who have purchased shopping products before, online or offline, at the shopping mall that auctions bidding products. For example, in a case where a plurality of bidding products, e.g., special offer products or limited products are placed at auction on the homepage for selling products as thanks to customers, the shopping products may be utilized for a thanks customer event in which customers who have purchased shopping products before may participate in auction of bidding products.

The communication terminal 200 may display (S330) the bidding product information, bidding schedule, and bidding start price received from the bidding product shopping mall server 300. Thus, the communication terminal 200 may display the bidding product information, bidding schedule, and bidding start price as shown in FIG. 5, and the bidders may identify the information and participate in the auction (S340).

Upon auction, the bidder's communication terminal 200 receives a desired purchase price and attends bidding. Here, desired purchase price should be equal to or higher than the bidding start price and, if the desired purchase price lower than the bidding start price is entered, bidding may be made impossible.

After the bidders' bidding has been made during the bidding period, the bidding product shopping mall server 300 proceeds with bidding at the bidding start price which is the lowest price and performs the winner determination step S350 to determine the winner among the bidders.

Referring to FIG. 6, the winner determination step S350 includes a bidding step S351 which receives desired purchase prices, which are not less than the bidding start price from the bidders' communication terminals 200 during the bidding period and receives bids, a bid ranking step S352 which ranks the bidders in descending order of desired purchase prices, and an awarding step S353 to determine the winner in higher order of bid ranks depending on the number of bidding products being sold.

After the winner determination step S350, the bidding product shopping mall server 300 performs a bidding product selling step S360 to sell the bidding product at the winner's bidding price.

The bidding product selling step S360 includes a bid rank result notification step S361 which transmits lists of bidders and desired purchase prices which have been sorted out in descending order of the desired purchase prices as shown in FIG. 7 to the bidders' communication terminals and a bid rank-linked selling step S362 which proceeds to sell the bidding products to the bidders in descending order of desired purchase prices. Having the result of bid ranks, the communication terminal 200 may display the result of bid ranks to allow the result to be known to the bidders as shown in FIG. 8.

The bid rank-linked selling step S362 proceeds to sell the bidding products to the bidders in descending order of desired purchase prices. For example, a notification is sent to the bidder who offered the highest price among the bidding prices and the bidding product is sold the highest bidder, and if the highest bidder does not pay, the next-highest bidder is inquired about whether he has intent to buy and if so, the bidding product is sold to the next-highest bidder.

To that end, the bid rank-linked selling step S362 includes a product purchase request step, a product selling complete step, a next-highest bidder purchase request step, and a next-highest bidder purchase repeat step.

The product purchase request step S3621 is the step of sending a request for purchasing the product at the desired purchase price to the communication terminal of the highest bidder who offered the highest bid.

The product selling complete step is the step of receiving a payment for the product from the highest bidder during a predetermined product selling period and completing the product sale. Where the highest bidder attempts to buy the winning bidding product, he may pay (S3624) his desired purchase price to buy the product.

Where it is determined whether a payment for purchasing the product is made within the product selling period (S3622) and no payment is made within the product selling period, the next-highest bidder purchase request step S3623 is performed in which a request for purchasing the product at the desired purchase price is sent to the next-highest bidder's communication terminal.

The next-highest bidder purchase request step S3623 determines (S3625) whether all of bidding products prepared have been sold out and is repeated until the prepared number of bidding products are sold out. Accordingly, priority for purchasing products is provided to bidders who offered higher desired purchase prices, thereby allowing the bidding products to sell at higher prices.

While the disclosure has been shown and described with reference to exemplary embodiments thereof, it will be apparent to those of ordinary skill in the art that various changes in form and detail may be made thereto without departing from the spirit and scope of the disclosure as defined by the following claims.

The invention claimed is:

1. A method for auctioning a bidding product associated with sales volume, the method comprising:

a bidding start price determination step in which a bidding product shopping mall server determines a bidding start price of a shopping product in association with the quantity of shopping products selling or sold online or offline;

a bidding information transmission step in which the bidding product shopping mall server transmits bidding product information, a bidding schedule, and the bidding start price to communication terminals of customers entitled to bid for a bidding product, wherein the customers entitled to bid for the bidding product are customers who have purchased a shopping product before online or offline at a shopping mall which auctions the bidding product;

a winner determination step in which the bidding product shopping mall server proceeds with bidding at the bidding start price, as a lowest price, for the customers during a preset bidding period; and a bidding product selling step in which the bidding product shopping mall server sells the bidding product at the winner's bidding price, wherein determining the bidding start price of the bidding product in association with the quantity of sold shopping product includes determining the bidding start price by a floating price calculated by a discount rate (%) set by a manager when the bidding product is registered, and wherein the bidding start price is determined by "bidding start price=consumer price of bidding product−floating price×quantity of sold shopping product," wherein the floating price is calculated by "floating price=consumer price of bidding product/quantity of sold shopping product×discount rate (%)", wherein the winner determination step includes a bidding step to receive desired purchase prices not less than the bidding start price from communication terminals of bidders of the bidding during the bidding period and to receive bids; a bid ranking step to calculate bid ranks of the bidders in descending order of desired purchase prices; and a bidding award step to determine a winner in descending order of the winning ranks, and wherein the bidding product selling step includes a bid rank result notification step which transmits lists of bidders and desired purchase prices which have been sorted out in descending order of the desired purchase prices to the bidders' communication terminals; and a bid rank-linked selling step which proceeds to sell the bidding product to the bidders in descending order of desired purchase prices.

2. The method of claim 1, wherein determining the bidding start price of the bidding product in association with the quantity of sold shopping product includes determining that the bidding start price decreases as the quantity of sold shopping products increases.

3. The method of claim 1, wherein the bid rank-linked selling step includes a product purchase request step to send a request for purchasing the product at the desired purchase price to the communication terminal of a highest bidder who offers a highest bid; a product selling complete step to receive a payment for the product from the highest bidder during a predetermined product selling period and complete the product sale; a next-highest bidder purchase request step to, when no payment is made within the product selling period, send a request for purchasing the product at the desired purchase price to a next-highest bidder's communication terminal; and a step of repeating the next-highest bidder purchase request step until all of a prepared number of bidding products are sold out.

\* \* \* \* \*